United States Patent [19]

Nakajima et al.

[11] 4,368,242
[45] Jan. 11, 1983

[54] MAGNETIC RECORDING MEDIUM

[75] Inventors: Kaoru Nakajima, Izumi; Masashi Somezawa, Sendai; Minoru Takamizawa, Annaka; Yoshio Inoue; Hiroshi Yoshioka, both of Annaka, all of Japan

[73] Assignees: Sony Corporation; Shin-Etsu Chemical Co., Ltd., both of Tokyo, Japan

[21] Appl. No.: 295,390

[22] Filed: Aug. 24, 1981

[30] Foreign Application Priority Data

Aug. 23, 1980 [JP] Japan .................. 55-116165

[51] Int. Cl.$^3$ .............................. H01F 10/02
[52] U.S. Cl. ............................ 428/447; 427/44; 428/522; 428/694; 428/900
[58] Field of Search ............. 427/44, 48, 127–132; 428/900, 694, 447, 522

Primary Examiner—Bernard D. Pianalto
Attorney, Agent, or Firm—Hill, Van Santen, Steadman, Chiara & Simpson

[57] ABSTRACT

The magnetic recording medium according to the present invention contains the magnetic layer comprising the magnetic or magnetizable powders or particles and the binder wherein the binder compound is represented by the following general formula (I):

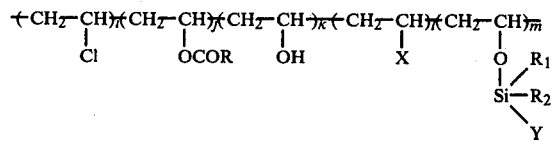

(wherein R is methyl group or ethyl group, $R_1$ is an alkyl group having from 1 to 4 carbon atoms, an alkoxy group having from 1 to 4 carbon atoms or a phenyl group, $R_2$ is an alkyl group having from 1 to 4 carbon atoms, an alkoxy group having from 1 to 4 carbon atoms, X is a group having a double bond, and Y is a group having a double bond, i is a number in the range of approximately 200 to 800, j is a number in the range of approximately 10 to 200, k is a number in the range up to approximately 200, l is a number in the range of approximately 3 to 100, and m is a number in the range of approximately 1 to 50). The compound is cured by the irradiation of radiation so that the magnetic recording medium has an improved durability and a superior resistance to chemicals as well as a good magnetic characteristics.

12 Claims, No Drawings

MAGNETIC RECORDING MEDIUM

BACKGROUND OF THE INVENTION

1. Field of the Invention

The present invention relates to a magnetic recording medium having a magnetic layer containing mainly a magnetic or magnetizable powder and a binder. 2. Brief Description of the Prior Art As a binder used for binding the magnetic or magnetizable powders to the supporting base for conventional magnetic recording medium such as magnetic tapes have been employed, for example, vinyl chloride-vinyl acetate-vinyl alcohol copolymers. This binder, however, cannot provide sufficient properties of decreasing the amount of the magnetic or magnetizable powders rubbing off during the operation of the magnetic recording medium and, at the same time, has a problem with a resistance to chemicals.

It is also known of another conventional binder extensively employed, which is treated on its surface with a silane coupling agent for the purpose of coupling the interfaces of the magnetic or magnetizable powders with the agent. In this case, the magnetic or magnetizable powders are bound through the silane coupling agents to the binder so that a problem with an increase in the rubbing-off amount of the magnetic or magnetizable powders or particles may be solved to some extent, but such binder cannot provide a sufficient physical strength and resistance to chemicals.

It has also been proposed to employ as a binder a compound which is sensitive to radiation, which can form a bridge structure with the magnetic or magnetizable powders in the binder upon irradiation of radiation so that physical strengths are to be improved, but it creates new problems which should be solved because the cured materials are too hard and nevertheless brittle.

OBJECTS AND SUMMARY OF THE INVENTION

Therefore, an object of the present invention is to provide a magnetic recording medium which can overcome or improve the disadvantages prevailing in the magnetic recording medium using the conventional binder together with magnetic or magnetizable powders.

Another object of the present invention is to provide a magnetic recording medium which has improved properties with respect to physical strengths and resistance to chemicals as well as durability.

A further object of the present invention is to provide a magnetic recording medium having a magnetic layer in which a new binder having improved properties is employed.

In accordance with the present invention, there is provided a magnetic recording medium having a magnetic layer in which a binder having the general formula as will be described hereinbelow is employed.

DETAILED DESCRIPTION OF THE PREFERRED EMBODIMENTS

The binder to be employed in the magnetic recording medium according to the invention may comprise components which may be regularly or random polymerized with each other. The polymer compounds suitable for the magnetic recording media produced in accordance with the present invention may include components which may be each represented by the recurring units having the following general formulas:

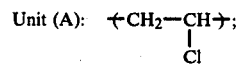

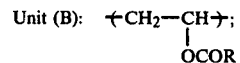

(wherein R is methyl group or ethyl group);

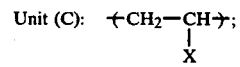

(wherein X is a group containing a double bond);

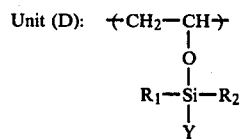

(wherein $R_1$ is an alkyl group having from 1 to 4 carbon atoms, an alkoxy group having from 1 to 4 carbon atoms or a phenyl group, $R_2$ is an alkyl group having from 1 to 4 carbon atoms, an alkoxy group having from 1 to 4 carbon atoms and Y is a group having a double bond).

The number of the recurring units as represented hereinabove as Unit (A) above which may be contained in the molecule of the compound may range approximately from 200 to 800. Likewise, the number of the recurring units as represented by Unit (B) above may be in the range approximately from 10 to 200. The number of the recurring units as represented by Unit (C) above may be in the range approximately from 3 to 100. The number of the recurring units as represented by Unit (D) hereinabove may range approximately from 1 to 50.

The polymer which is composed of the aforesaid polymer components as represented by Units (A) through (D) may contain optionally an additional unit as represented by the following recurring unit (E):

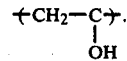

The number of the recurring units represented by Unit (E) above which may be optionally added to the polymer compound may range up to approximately 200.

Accordingly, the polymer compounds to be employed for the magnetic recording media produced in accordance with the present invention may be briefly represented by the following general formula (I):

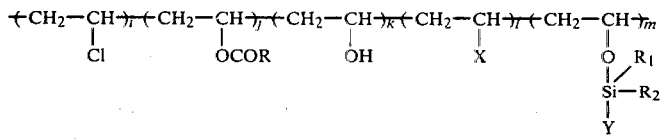

(wherein R, $R_1$, $R_2$, X and Y have the same meanings as represented hereinabove, i is a number in the range of approximately 200 to 800, j is a number in the range of approximately 10 to 200, k is a number in the range up to approximately 200, l is a number in the range of approximately 3 to 100, and m is a number in the range of approximately 1 to 50). It is to be noted herein that the order of the above components may be arbitrarily modified or changed according to the mode of reaction. It is thus to be understood that the general formula (I) merely indicates the whole picture of the components to be contained as a whole in the molecule of the compound used in accordance with the present invention, not the detailed structure of the compound.

More specifically, the symbol X indicated in the compounds represented by the above-mentioned general formula as Unit (C) may include, for example: —O—COCH=CH$_2$, —OCOC(CH$_3$)=CH$_2$ or the residue of a dicarboxylic acid.

The residue of the dicarboxylic acid as represented by the symbol X may be the residue of a reaction product of the dicarboxylic acid or a hydroxyacrylic acid or a hydroxymethacrylic acid. The dicarboxylic acid may include, for example, an aliphatic dicarboxylic acid, such as succinic acid, malonic acid, citric acid, oxalic acid, adipic acid, sebacic acid, azelaic acid and the like. The hydroxyacrylic and hydroxymethacrylic acid may be, for example, 2-hydroxyethylacrylic acid and 2-hydroxyethylmethacrylic acid. The residue of the reaction product of, for example, adipic acid with 2-hydroxyethylacrylic acid or with 2-hydroxyethylmethacrylic acid may be represented by the following formulas:

or

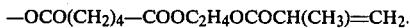

The symbol Y which is indicated by Unit (D) specifically includes, for example: —CH=CH$_2$; —(CH$_2$)$_3$OC(CH$_3$)=CH$_2$; —(CH$_2$)$_3$—OCOCH=CH$_2$; —(CH$_2$)$_3$—NH—COCH=CH$_2$; —(CH$_2$)$_3$—NH—COC(CH$_3$)=CH$_2$; —(CH$_2$)$_3$—SCOCH=CH$_2$; or —(CH$_2$)$_3$—SCOC(CH$_3$)=CH$_2$.

Among those as represented by the symbol Y are particularly preferred those having the acrylic and methacrylic type double bond.

The polymer compounds represented as having the aforesaid recurring units may be employed singly or in admixture with each other as the binder. It is also to be noted that the polymer compounds in accordance with the present invention may be used in admixture with a binder which may be conventionally employed for this purpose and/or which is not sensitive and which is not cured by the irradiation of radiation and/or which is sensitive to the irradiation of radiation. Such binders which may be mixed with the compound and compounds in accordance with the present invention may include, for example, vinyl chloride-vinyl acetate copolymers, vinyl chloride-vinyl acetate-vinyl alcohol copolymers, vinyl chloride-vinyl acetate-maleic acid copolymers, vinyl chloride-vinylidene chloride copolymers, vinyl chloride-acrylonitrile copolymers, acrylic acid ester-acrylonitrile copolymers, acrylic acid ester-vinylidene chloride copolymers, methacrylic acid ester-vinylidene chloride copolymers, methacrylic acid ester-styrene copolymers, thermoplastic polyurethane resins, phenoxy resins, polyvinyl fluroride, vinylidene chloride-acrylonitrile copolymers, acrylonitrile-butadiene copolymers, acrylonitrile-butadiene-methacrylic acid copolymers, polyvinylbutyrals, cellulose derivatives, styrene-butadiene copolymers, polyester resins, phenol resins, epoxy resins, thermosetting polyurethane resins, urea resins, melamine resins, alkyd resins, urea-formaldehyde resins. The amount of the compound or compounds to be used as the binder or binders in accordance with the present invention, which may be employed in admixture with the other binder or binders may be in the range up to approximately 10% by weight based on the total weight of the binders to be employed.

The polymer compounds in accordance with the present invention may be prepared by various methods which may be conventionally applied to the preparation of polymers.

Representative of the methods for preparing the polymer compounds in accordance with the present invention may be a method involving the reaction of a vinyl chloride-vinyl acetate-vinyl alcohol copolymer containing the recurring units as represented by the above-mentioned units (A), (B) and (E) with acrylic chloride (CH$_2$=CHCOCl) or with methacrylic chloride (CH$_2$=C(CH$_3$)COCl) and an organosilane compound as represented by the following general formula:

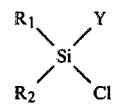

(wherein $R_1$, $R_2$ and Y have the same meanings as represented hereinabove). The reaction may be carried out in the presence of an agent for eliminating hydrochloric acid in a suitable solvent at a temperature ranging from approximately 20° to 120° C. The solvent which may be conveniently employed for this reaction may include, for example, a ketone such as acetone, methylethylketone, methylisobutylketone or the like, an ester such as ethyl acetate, butyl acetate or the like, an aromatic hydrocarbon such as benzene, toluene, xylene or the like, a chlorinated hydrocarbon such as dichloroethane, trichloroethane, trichloroethylene, tetrachloromethane or the like. The agents which can eliminate hydrochloric acid in the reaction as represented immediately hereinabove may include, for example, an amine such as pyridine, picoline, triethylamine or the like, an epoxy compound such as ethylene oxide, propylene oxide or the like.

Alternatively, the polymer compounds in accordance with the present invention may be representatively prepared by the method which involves reacting the vinyl chloride-vinyl acetate-vinyl alcohol copolymer as represented hereinabove with an organosilane compound as represented by the following general formula:

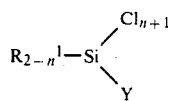

(whereinn is 0, 1 or 2, and $R^1$ and Y have the same meanings as represented hereinabove). The reaction may be conducted in substantially the same manner as hereinabove with an agent for eliminating hydrochloric acid and then the resulting product is converted into the corresponding alkoxy compound by the reaction with an alcohol having the general formula: R—OH (wherein R has the same meaning as hereinabove) or phenol. The agent for eliminating hydrochloric acid and the solvent to be employed for this reaction may be the same as employed for the reaction as represented hereinabove.

In the reaction schemes as represented hereinabove, where the polymer compounds in accordance with the present invention in which the recurring units as indicated by Unit (E) are absent, the starting compounds or vinyl chloride-vinyl acetate-vinyl alcohol copolymers have an vinyl alcohol components in the amount sufficient to be convertible into the recurring units as represented by Units (C) and (D) above. Where the compounds in accordance with the present invention, which contain the optional recurring units as indicated by Unit (E), are obtained, there is employed a starting compound containing the polymer units or vinyl alcohol components in an amount sufficient to remain unreacted as recurring units as represented by Unit (E).

The magnetic powders or magnetizable particles used in magnetic recording media produced in accordance with the present invention may be composed of any available magnetic or magnetizable material, such as gamma hematite (gamma-$Fe_2O_3$); magnetite ($Fe_3O_4$); gamma hematitie or magnetite doped with non-ferrous atoms, such as cobalt; iron oxides of non-stoichiometric oxidation compounds between gamma hematite and magnetite; chromium dioxide ($CrO_2$); magnetic or magnetizable alloys, such as an iron-cobalt alloy (Fe-Co), iron-cobalt-nickel alloy, such alloys containing a further non-metallic element or a metallic element such as a transition metal element, or the like; mixtures of the above or other magnetic or magnetizable materials.

Magnetic recording media produced in accordance with the present invention may also contain antistatic agents of the type conventionally used with magnetic recording media. An example of a suitable antistatic agent is carbon black but other suitable antistatic agents may also be used. Further, dispersing agents, such as lecithin and the like, may be added to a magnetic layer of a magnetic recording medium in accordance with the conventional practice. An abrasive material, such as aluminum oxide, chromium oxide or silicon oxide may also be employed. Furthermore, the magnetic layer on the magnetic recording medium may contain a lubricant, such as molybdenum disulfide, graphite or silicone oil.

The non-magnetic supporting material or base to be used for the magnetic recording medium in accordance with the present invention may be a conventional one and may include, for example, polyesters such as polyethylene terphthalate; polyolefins such as polypropylene, cellulose derivatives such as cellulose triacetate or cellulose diacetate; polycarbonates, polyvinyl chlorides, polyimides, metals such as aluminum or copper; and fibrous materials such as papers.

The magnetic recording medium produced in accordance with the present invention may be produced by irradiating after the compound as represented hereinabove, together with the magnetic or magnetizable powders or particles and other components for the magnetic layer, is coated on the non-magnetic supporting material. The radiations suitable for being irradiated on the magnetic layer may be, for example, electron rays, neutron rays, gamma rays and the like. The dose of the radiations may range preferably from approximately 1 to 10 Mrad and more preferably from approximately 2 to 7 Mrad. The energy of irradiation may be above approximately 100 KeV. The mode of irradiating the radiations may be a conventional one.

The magnetic recording media in accordance with the present invention may comprise any of the known forms, such as magnetic recording tapes having a flexible non-magnetic films, discs having a relatively rigid non-magnetic base such as composed of a ceramic or a metal, for example, aluminum.

As the polymer compounds to be employed in accordance with the present invention possess at least four double bonds which are contained in the recurring units as represented by Units (C) and (D), they can be cured efficiently by irradiation so that they can provide sufficient strength as binders and an improved durability as the magnetic layer of the magnetic recording media. As they also contain a silicone unit or units in the molecular structure of the compounds thereof, they can provide a satisfactory stretchability as well as a sufficient physical strength. The silanol components in the magnetic layer of the magnetic recording medium in accordance with the present invention can also serve as chemically binding the binder to the surface of the inorganic magnetic or magnetizable powders or particles. The chemical bond between the magnetic or magnetizable powders and particles and the binder components, in combination with the curing of the alkoxy groups as indicated by the symbols $R_1$ and/or $R_2$ by means of the irradiation, can prevent the magnetic or magnetizable powders or particles from rubbing off and thereby improve the durability of the magnetic recording medium resulting therefrom. Where the symbols as represented by the symbol $R_1$ and $R_2$ are each an alkoxy group, they can be eliminated by hydrolysis and bonded to the magnetic powders or magnetizable particles. Where the silanol group contains an alkyl grohup or a phenyl group as the symbols $R_1$ and/or $R_2$, the silanol group itself can be eliminated by hydrolysis between the main polymer chain of the compounds of the invention and the Si atom attached thereto and can provide a favorable compatibility with the inorganic magnetic or magnetizable powders or particles. As the free silanol groups also contain therein acrylic or vinylic double bonds as contained in the symbol Y of the silanol components, the double bonds are cured with each other or with the polymer compounds in accordance with the present invention by means of the irradiation of radiation so that the silanol components, even if they would once have been freed from the polymer compounds in accordance therewith, are not eliminated from the magnetic layer. The silane coupling agents which have been conventionally employed in the magnetic layer of the magnetic recording media can provide an improved compatibility with the magnetic or magnetizable powders or particles, but cannot allow a chemical bond therewith. Thus, they can serve as improving the prevention of the rubbing-off of the magnetic layer to some extent because, when the silane coupling agents are present with water and the magnetic or magnetizable particles or powders, the silanol groups are formed and may be bound to the surfaces of the magnetic or magnetizable powders or particles.

The magnetic recording media in accordance with the present invention can prevent the magnetic or magnetizable powders or particles from rubbing off particularly when the operation is conducted under severe conditions. Accordingly, they can improve difficulties and disadvantages resulting from the rubbing-off of the magnetic layer that signals are removed and that a spacing loss between the magnetic head and the magnetic recording medium is caused whereby serious drawbacks with respect to recording and reproduction of signals can be overcome.

The present invention will be described more in detail by way of synthesis and working examples.

SYNTHESIS EXAMPLE 1

A reaction flask equipped with a stirrer, a thermometer, a reflux condenser and a dropping funnel was charged with 660 grams of toluene and 1,000 grams of methylisobutylketone and heated to 40° C. To this mixture were added with stirring 225 grams of vinyl chloride-vinyl acetate-vinyl alcohol copolymer comprising 89.5 mol% of the vinyl chloride component, 2.2 mol% of the vinyl acetate component and 8.3 mol% of the vinyl alcohol component and having an average polymerization degree of 430 and dissolved therein. To this solution were added 33.3 grams of triethylamine and then 18.8 grams of methacrylic chloride and 7.2 grams of vinyl dimethyl chlorosilane were dropwise added thereto. As the dropwise addition started reaction, triethylamine hydrochloride precipitated out. After the reaction was continued for 2 hours at 60° C. thereafter, the temperature was raised to 110° C. and excess triethylamine was distilled off. After cooling, the removal of the precipitated triethylamine hydrochloride by filtration gave 1,554 grams of a pale yellow transparent liquid which contained the resinous component having a solution viscosity of 178 centistokes at 25° C. in the amount of 20%. To this solution was added methanol thereby precipitating out a product which gave, after purification, a pale yellow gummy material. This material was confirmed by infrared absorption spectrum, nuclear magnetic resonance and elementary analysis as having the components as shown in Table 1 below.

SYNTHESIS EXAMPLE 2

A reaction flask equipped with a stirrer, a thermometer, a reflux condenser and a dropping funnel was charged with 700 grams of toluene and 1,050 grams of methylisobutylketone and the mixture was heated to 40° C. To this solution were added, with stirring, 259 grams of vinyl chloride-vinyl acetate-vinyl alcohol copolymer comprising 89.5 mol% of the vinyl chloride component, 2.2 mol% of the vinyl acetate component and 8.3 mol% of vinyl alcohol component and having an average polymerization degree of 430 and then dissolved therein. To this solution were added 48.9 grams of triethylamine and then 25.0 grams of acrylic chloride were dropwise added thereto. After the reaction was conducted for 2 hours at 60° C., 16.6 grams of gamma-methacryloxypropylmethyl dichlorosilane were dropwise added thereto and the reaction was further continued for 2 hours. After 3.2 grams of ethanol were dropwise added and further the reaction was conducted for 1 hour, the inner temperature was raised to 110° C. or higher to remove the excess triethylamine. After cooling, the triethylamine which crystallized out was removed by filtration, thereby giving 1,822 grams of a pale brown transparent liquid which contained the resinous solution having a solution viscosity of 154 centistokes at 25° C. in the amount of 20%. To this solution was added ethanol so as to precipitate out a copolymer which gave, after purifying, a yellow gummy material which was characterized by infrared absorption spectrum, nuclear magnetic resonance and elementary analysis, as having the components as shown in Table 1 below.

SYNTHESIS EXAMPLES 3 THROUGH 9

The compounds as shown in Table 1 below were prepared in substantially the same manner as described in Synthesis Example 1 or 2, which were confirmed likewise by infrared absorption spectra, nuclear magnetic resonance and elementary analysis as having the components as shown in Table 1 below.

TABLE 1

Synthesis Example 1

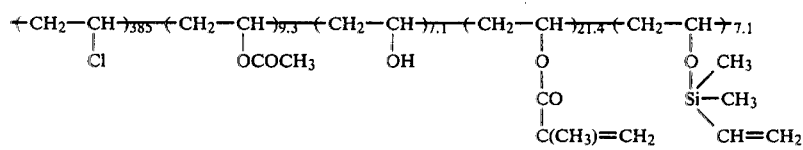

Synthesis Example 2

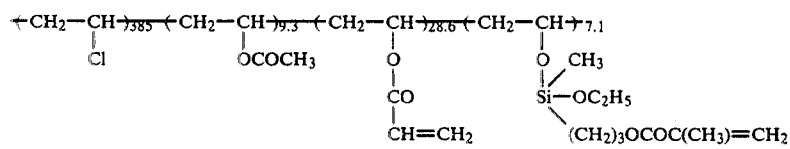

Synthesis Example 3

TABLE 1-continued
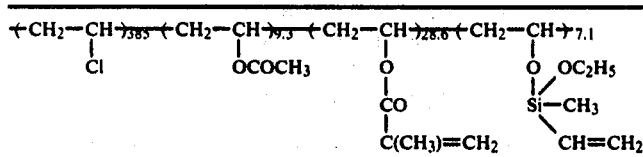
Synthesis Example 4
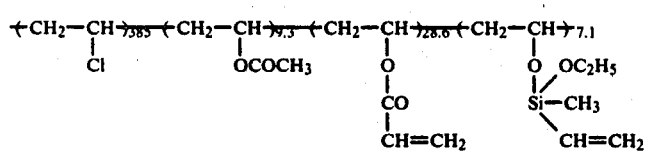
Synthesis Example 5
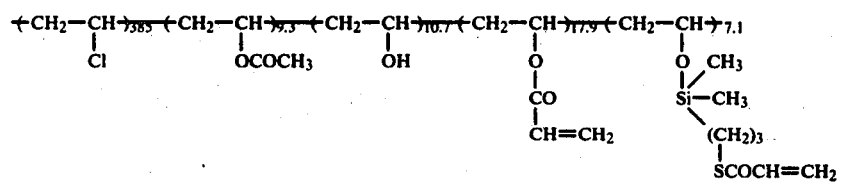
Synthesis Example 6
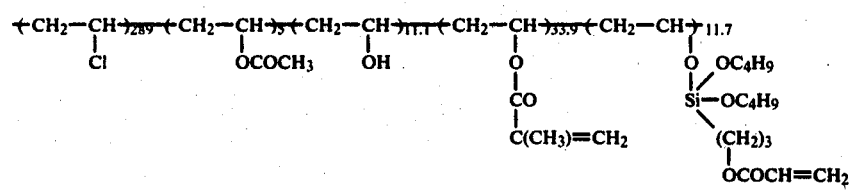
Synthesis Example 7
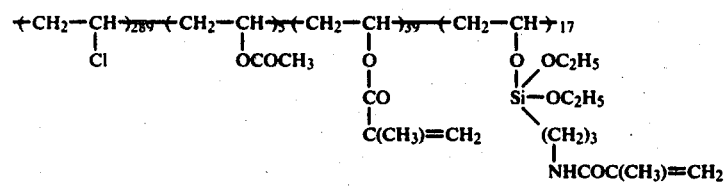
Synthesis Example 8
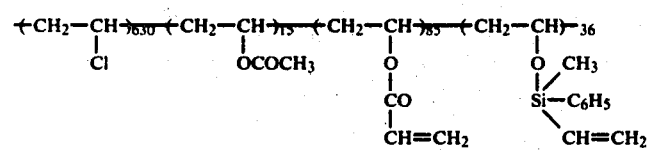
Synthesis Example 9
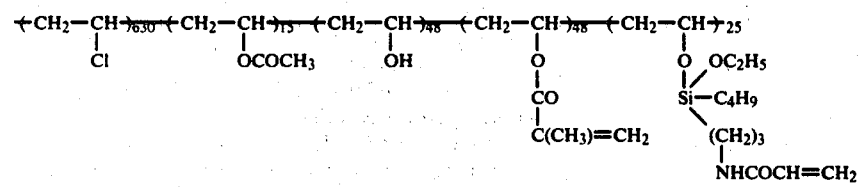
EXAMPLE 1
A magnetic tape was prepared using a magnetic paint having the following composition:
| Compositions | Weight (parts by weight) |
|---|---|
| Compound of Synthesis Example 1 | 100 |
| gamma-$Fe_2O_3$ | 300 |

-continued

| Compositions | Weight (parts by weight) |
|---|---|
| Lecithin | 3 |
| Squalene | 9 |
| $Cr_2O_3$ | 3 |
| Methylethylketone | 500 |
| Methylisobutylketone | 500 |

The magnetic paint having the aforesaid composition was ball milled and coated on a polyethylene terephthalate having a thickness of 16 microns. After drying and calendering at 80° C. under a pressure of 40 kg/cm, the electron rays were irradiated on the magnetic layer at an accelerating voltage of 200 KV and 5 Mrad. The magnetic tape was then cut into ½ inch wide strips.

EXAMPLE 2

A magnetic tape was prepared using a magnetic paint having the following composition:

| Compositions | Weight (parts by weight) |
|---|---|
| Compound of Synthesis Example 2 | 100 |
| gamma-$Fe_2O_3$ | 300 |
| Lecithin | 3 |
| Squalene | 9 |
| $Cr_2O_3$ | 3 |
| Methylethylketone | 500 |
| Methylisobutylketone | 500 |

The magnetic tape was prepared in substantially the same manner as in Example 1.

EXAMPLE 3

A magnetic tape was prepared using a magnetic paint having the following composition:

| Composition | Weight (parts by weight) |
|---|---|
| Allonix M-7100 | 100 |
| gamma-$Fe_2O_3$ | 300 |
| Lecithin | 3 |
| Squalene | 9 |
| $Cr_2O_3$ | 3 |
| Methylethylketone | 500 |
| Methylisobutylketone | 500 |

The magnetic tape was prepared in substantially the same manner as in Example 1.

COMPARATIVE EXAMPLE 1

A magnetic tape was prepared in substantially the same manner as in Example 1 with the exception that a conventional silane coupling agent was employed in place of the compound of Synthesis Example 1.

COMPARATIVE EXAMPLE 2

A conventional magnetic tape was employed for comparison purposes.

Each of the magnetic tapes thus prepared was then tested for their characterization with respect to the rubbing-off amount of magnetic powders (mg), life (dB), percent extraction with solvent (%) and resistance to methylethylketone. The life of the magnetic tape was determined by the attenuation of signals after 100 runnings. The percent extraction with solvent was calculated by dividing by the total charged amount of binders the amount obtained by deducting the charged amounts of lecithin and squalene from the total extraction amount obtained by the Soxhlet extraction method. The resistance to methylethylketone was determined by measuring the number of abrasions until the base on which the magnetic layer was formed was exposed.

TABLE 2

| Examples | Rubbing-Off Amount of Magnetic Powders (mg) | Life (dB) | Percent Extraction with Solvent (%) | Resistance to Methylethylketone |
|---|---|---|---|---|
| Example 1 | 0.31 | −0.7 | 2.9 | 570 |
| Example 2 | 0.12 | −0.5 | 1.2 | 600 |
| Example 3 | 1.30 | −1.5 | 3.3 | 470 |
| Comparative Example 1 | 0.97 | −1.3 | 7.6 | 90 |
| Comparative Example 2 | 1.36 | −1.7 | 6.0 | 70 |

It is apparent from the results of Table 2 that the magnetic tapes produced in accordance with the present invention are superior in physical properties and magnetic characteristics than those tested for comparative purposes.

Using the compounds prepared by Synthesis Examples 3 through 9, the magnetic tapes were prepared in substantially the same manner as in Example 1 or 2 and found that they have substantially the same characteristics as those prepared in Examples 1 and 2.

What is claimed is:

1. A magnetic recording medium having a magnetic layer comprising magnetic or magnetizable powders or particles, and a binder comprising at least one compound represented by the following general formula (I):

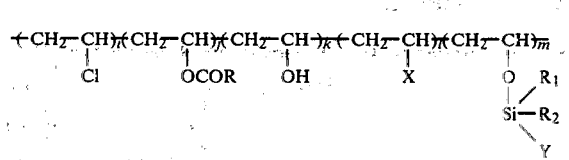

(wherein R is a methyl or ethyl group, $R_1$ is an alkyl group having from 1 to 4 carbon atoms, an alkoxy group having from 1 to 4 carbon atoms or a phenyl group, $R_2$ is an alkyl group having from 1 to 4 carbon atoms or an alkoxy group having from 1 to 4 carbon atoms, X is a group containing a double bond, Y is a group containing a double bond, i is a number in the range of approximately 200 to 800, j is a number in the range of approximately 10 to 200, k is a number in the range up to approximately 200, l is a number in the range of approximately 3 to 100, and m is a number in the range of approximately 1 to 50).

2. A magnetic recording medium according to claim 1, wherein the compound is represented by Formula (I) in which R is methyl group, X is —OCOC($CH_3$)=$CH_2$, $R_1$ is ethoxy group, $R_2$ is butyl group, Y is —($CH_2$)$_3$NH-COCH=$CH_2$, i is 630, j is 15, k is 48, l is 48, and m is 25.

3. A magnetic recording medium according to claim 1, wherein the compound is represented by Formula (I) in which R is methyl group, X is —OCOC($CH_3$)=$CH_2$, $R_1$ is methyl group, $R_2$ is methyl group, Y is —CH=$CH_2$, i is 385, j is 9.3, k is 7.1, l is 21.4, and m is 7.1.

4. A magnetic recording medium according to claim 1, wherein the compound is represented by Formula (I)

in which R is methyl group, X is —OCOCH=CH$_2$, R$_1$ is methyl group, R$_2$ is ethoxy group, Y is —(CH$_2$)$_3$OCOC(CH$_3$)=CH$_2$, i is 385, j is 9.3, l is 28.6, and m is 7.1.

5. A magnetic recording medium according to claim 1, wherein the compound is represented by Formula (I) in which R is methyl group, X is —OCOC(CH$_3$)=CH$_2$, R$_1$ is methyl group, R$_2$ is ethoxy group, Y is —CH=CH$_2$, i is 385, j is 9.3, l is 28.6, and m is 7.1.

6. A magnetic recording medium according to claim 1, wherein the compound is represented by Formula (I) in which R is methyl group, X is —OCOCH=CH$_2$, R$_1$ is methyl group, R$_2$ is ethoxy group, Y is —CH=CH$_2$, i is 385, j is 9.3, l is 28.6, and m is 7.1.

7. A magnetic recording medium according to claim 1, wherein the compound is represented by Formula (I) in which R is methyl group, X is —OCOCH=CH$_2$, R$_1$ is methyl group, R$_2$ is methyl group, Y is —(CH$_2$)$_3$SCOCH=CH$_2$, i is 385, j is 9.3, k is 10.7, l is 17.9, and m is 7.1.

8. A magnetic recording medium according to claim 1, wherein the compound is represented by Formula (I) in which R is methyl group, X is —OCOC(CH$_3$)=CH$_2$, R$_1$ is butoxy group, R$_2$ is butoxy group, Y is —(CH$_2$)$_3$OCOCH=CH$_2$, i is 289, j is 5, k is 11.1, l is 33.9, and m is 11.7.

9. A magnetic recording medium according to claim 1, wherein the compound is represented by Formula (I) in which R is methyl group, X is —OCOC(CH$_3$)=CH$_2$, R$_1$ is ethoxy group, R$_2$ is ethoxy group, Y is —(CH$_2$)$_3$NHCOC(CH$_3$)=CH$_2$, i is 289, j is 5, l is 39, and m is 17.

10. A magnetic recording medium according to claim 1, wherein the compound is represented by Formula (I) in which R is methyl group, X is —OCOCH=CH$_2$, R$_1$ is methyl group, R$_2$ is phenyl group, Y is —CH=CH$_2$, i is 630, j is 15, l is 85, and m is 36.

11. A magnetic recording medium according to claim 1, wherein the compound is cured by irradiation in an amount ranging from approximately 1 to 10 Mrad.

12. A magnetic recording medium according to claim 11, wherein the strength of irradiation ranges from approximately 2 to 7 Mrad.

* * * * *